(12) United States Patent
Wang et al.

(10) Patent No.: US 6,365,710 B1
(45) Date of Patent: Apr. 2, 2002

(54) METHOD FOR REMOVING VOLATILE COMPONENTS FROM SOLID POLYMERIC MATERIALS

(75) Inventors: Hua Wang, Clifton Park; Robert John Hossan, Delmar, both of NY (US); Eric Thomas Gohr, Mt. Vernon, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/942,065

(22) Filed: Aug. 29, 2001

(51) Int. Cl.[7] .................................................. C08G 6/00
(52) U.S. Cl. ...................... 528/480; 528/196; 528/198; 528/481; 528/487; 528/499; 528/502
(58) Field of Search .................................. 528/502, 196, 528/198, 480, 481, 487, 409; 264/176.1

(56) References Cited

U.S. PATENT DOCUMENTS

| | | | |
|---|---|---|---|
| 4,845,193 A | 7/1989 | Umemura et al. | 528/502 |
| 5,232,649 A | 8/1993 | Andersen et al. | 264/211.23 |
| 5,717,055 A | 2/1998 | Hosomi et al. | 528/196 |

FOREIGN PATENT DOCUMENTS

| | | |
|---|---|---|
| JP | 9193230 | 7/1997 |

*Primary Examiner*—Terressa M. Boykin
(74) *Attorney, Agent, or Firm*—Andrew J. Caruso; Norren C. Johnson

(57) ABSTRACT

A method for removing volatile components from wet, solid polymeric materials on a vacuum vented extruder is described. Polymeric materials containing substantial amounts of water, 1–20 % by weight, are rapidly converted to polymer compositions containing less than about 0.5% by weight water at high throughput rates while avoiding complications resulting from excessive steam backflow through the extruder feed throat. The method utilizes a screw design comprising only forward flighted screw elements in an initial polymer melting and kneading zone. Steam generated as the polymer is heated and sheared flows downstream to a first vacuum vent for removal. The partially devolatilized polymer melt is then subjected to additional kneading and vacuum venting. The claimed method converts wet polycarbonate powder containing residual methylene chloride to essentially dry polycarbonate powder containing less than about 1 ppm methylene chloride.

63 Claims, 1 Drawing Sheet

METHOD FOR REMOVING VOLATILE COMPONENTS FROM SOLID POLYMERIC MATERIALS

BACKGROUND OF THE INVENTION

This invention relates to a method for removing volatile components such as water and volatile organic compounds such as solvents from solid polymeric materials using an extruder. The method of the present invention avoids excessive backflow of the volatile components through the extruder feed throat, a condition which severely limits throughput rates.

The manufacture of various polymers frequently involves a final drying step in order to remove water and other volatile components utilized in the process used to prepare the polymer. In some instances, the drying process involves treating a wet polymer powder containing volatile components such as solvents or other volatile materials in a fluidized bed dryer. Such equipment is frequently large and costly, comprising large industrial dryers, nitrogen delivery systems, and scrubber systems to control the unwanted escape of volatile components into the environment. While such fluidized bed dryers are typically effective at reducing the moisture and volatile organic content of a variety of polymeric materials, processes using them are relatively slow and costly.

During the drying of polymeric powders, rates of drying may be dependent upon the particle size and particle size distribution. For example, typical polycarbonate powders isolated following the interfacial polymerization of a dihydroxy aromatic compound with phosgene have a broad distribution of particle sizes ranging from less than 100 micrometers to well above 1 millimeter. When the moisture level present in a polymer powder falls below a critical moisture content, drying rates may be limited by the rates of liquid diffusion and capillary transport in the powder particles. Thus, the last stages in the drying of a polymer powder may be difficult and require long drying times. It would be desirable, therefore, to discover means for the efficient removal of volatile components from solid polymeric materials which does not involve the use of complex equipment such as fluidized bed dryers. In particular, it would be desirable to discover a highly efficient means of removing volatile components from wet polycarbonate powders.

The present invention provides an alternate method for drying solid polymeric materials containing volatile components such as water and organic solvents using a devolatilization extruder. The method employs standard equipment of a type readily available in typical polymer finishing facilities and may be adapted to include other operations involving the polymer as well, such as blending with other polymers, functionalization by chemical reaction, and controlled molecular weight adjustment. The present invention reduces the need for fluidized bed-type drying operations, and allows the conversion of solid polymeric materials containing high levels of water into polymer compositions which are substantially free of water in a single extrusion step. The removal of water from the polymeric material using the method of the present invention also produces as an unexpected benefit, the simultaneous removal of process solvents and trace impurities, such as residual monomer and low molecular weight oligomers ("lows"), which can impact product characteristics such as plate-out during molding of the final polymer composition. The method of the present invention represents a simple, low cost advance in polymer drying technology, and may afford polymer compositions having improved product properties relative to polymer compositions prepared using conventional drying technology.

In contrast to the present invention, in which a solid polymeric material containing volatile components is subjected to extrusion devolatilization, the extrusion devolatilization of polymers in solution is well known. For example, Curry and Brauer in Polymer Devolatilization, R. Albalak Ed. Marcel Deker Inc., p 345, 1996, describe the conversion of a solution of high density polyethylene in cyclohexane into a solid polymeric material containing about 10% by weight cyclohexane, using an extruder based process comprising rapid removal of solvent from a superheated solution of the polymer in cyclohexane in an extruder, said extruder being equipped for multistage stripping agent injection and venting.

The process described by Curry and Brauer, however, is inapplicable to the removal of substantial quantities of volatile substances from polymeric materials in powder form, such as wet polycarbonate powders isolated following interfacial polymerization. Such polycarbonate powders typically contain between about 1 and about 20 percent by weight water, and between about 0.001 and about 5 percent by weight methylene chloride. Attempts to devolatilize such powders using an extruder are hampered by the tendency of the steam generated as the polycarbonate powder is sheared and heated above its glass transition temperature to "back out" of the feed throat of the extruder. The steam fluidizes the powdered polymeric material being introduced at the feed throat and causes feeding problems, such as powder escaping from the feed throat and powder "bridging" at the feed throat. Feeding problems of this type may be eased somewhat through the use of auxiliary devices, such as screw feeder stuffers and crammer feeders. However, such devices are frequently ineffective since the fine powders propelled by steam escaping from the extruder may still escape from the stuffers and crammer feeders. In addition such auxiliary devices further increase the cost and complexity of the drying operation.

Another potential solution to the feeding problems described above is the employment of additional step to compact or agglomerate the wet powder into larger particles prior to introduction of the powder into the extruder. Again, this requires dedicated equipment for additional process steps, resulting in increased process complexity, higher capital and operating costs.

U.S. Pat. No. 5,232,649 discloses a process which uses the mechanical force of the screws in a twin screw extruder to squeeze water and other volatiles from a wet polymeric material. The water is removed from the polymer in a liquid state rather than as steam. While such a process works well for polymeric materials having low glass transition temperatures (Tg), for example materials having Tg's below 100° C., it is inapplicable to the efficient removal of water and other volatile substances from higher Tg polymeric materials such as polycarbonate due to severe limitations of throughput rates.

U.S. Pat. No. 5,717,055 discloses a process for producing polycarbonate pellets by melt-kneading a polycarbonate power in the kneading section of an extruder which comprises a "melt seal" mechanism consisting of reverse-flighted screw elements or a dam ring. High vacuum is applied at a vent downstream of the "melt seal" to remove volatile components. It is well known, however, that when reverse-flighted (left handed) screw elements are used, the upstream screw section must be completely filled over a certain distance in order to generate the pressure necessary to override the reverse-flighted (left handed) section (Rauwendaal, Plastics Formulating & Compounding, November/December, 1995). Thus, steam generated in the screw sections preceeding the reverse-flighted section is forced to flow back along the screws and out of the feed throat of the extruder. Again, the emerging steam fluidizes the powdered polymeric material being fed to the extruder and may cause feeding problems. Where the polymer being introduced into the extruder contains a substantial amount of water and other volatile components, the rate of introduction of the polymer must be limited in order to avoid the effects of large amounts of steam escaping through the feed throat and only a fraction of the total torque and power available for polymer processing is used. For productivity reasons, it is a disadvantage not to be able to operate the extruder near the torque and power limitation of the extruder, as in the case of dry powder compounding.

U.S. Pat. No. 4,845,193 discloses a process for producing a low particle polycarbonate comprising supplying a wet polycarbonate powder having a water content of from 0.5 to 10 percent by weight and an organic solvent content of from 0.01 to 5 percent by weight to a vented extruder. The reference discloses a conventional screw design and product output rates fall well below those achieved using the method of the present invention.

Japanese Patent, JP09193230, discloses a process of injecting water into molten polycarbonate in the kneading portion of an extruder as a means of removing volatile components of the polycarbonate. In this case, however, the polymer is already molten at the point at which the water is introduced and steam is not forced back along the screws to the feed throat. The process is inapplicable in cases where the polymeric material to be extruded is a powder containing a substantial amount of water such as wet polycarbonate powder containing methylene chloride.

BRIEF SUMMARY OF THE INVENTION

The present invention provides a method for removing volatile components from a solid polymeric material, said method comprising:

Step (A) introducing a solid polymeric material comprising water, into an extruder said extruder comprising;
  (i) a primary kneading and melting section, said primary kneading and melting section consisting essentially of forward flighted kneading elements and optionally, forward flighted conveying elements;
  (ii) a first vacuum vent located downstream of said primary kneading and melting section;
  (iii) a secondary melt kneading section located downstream of the first vacuum vent; and
  (iv) a second vacuum vent located downstream of said secondary melt kneading section;

Step (B) heating and shearing said polymeric material in said primary kneading and melting section to form a polymer melt comprising water;

Step (C) removing a portion of the water from the polymer melt through said first vacuum vent to form a partially devolatilized polymer melt;

Step (D) subjecting the partially devolatilized polymer melt to additional melt kneading in a secondary melt kneading section; and Step (E) removing an additional amount of water from the partially devolatilized polymer melt at said second vacuum vent.

The present invention further relates to a method for performing a second operation involving the polymeric material, such as blending, compounding or chemical modification, during extruder devolatilization. In one aspect of the present invention, this second operation comprises the introduction of a hydrolysis catalyst into the extruder during the extruder devolatization of wet polycarbonate and effecting a controlled molecular weight reduction of the polycarbonate. In another aspect of the present invention a polymer blend is prepared during the extruder devolatilization.

DETAILED DESCRIPTION OF THE INVENTION

Figure 1:
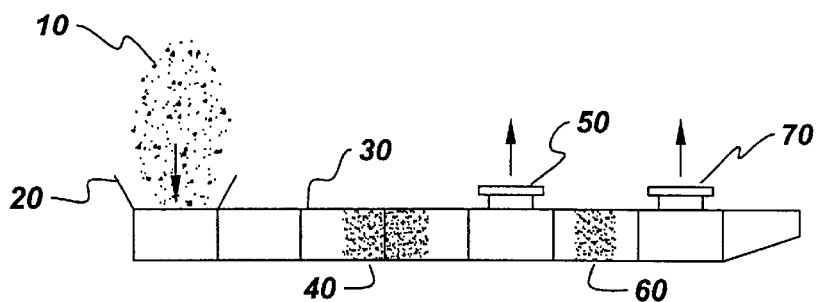
FIG. 1 illustrates an extruder configured according to the method of the present invention and shows the location of the feed throat, primary kneading and melting section, first vacuum vent, secondary melt kneading section and second vacuum vent.

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, polycarbonates are named according to their constituent bisphenols, thus "bisphenol A polycarbonate" and "1,1-bis(3-methyl-4-hydroxyphenyl)cyclohexane polycarbonate" are used to designate polycarbonates comprising structural units derived from the bisphenols "bisphenol A" and "1,1-bis(3-methyl-4-hydroxyphenyl)cyclohexane" respectively.

"BPA" is herein defined as bisphenol A or 2,2-bis(4-hydroxyphenyl)propane.

As used herein, the term "extruder devolatilization" refers to the removal of volatile components, such as water and methylene chloride, from a polymeric material, such as polycarbonate, using an extruder comprising at least one vacuum vent, and is used interchangeably with the term "extrusion devolatilization".

As used herein, the terms "double screw extruder" and "twin screw extruder" are used interchangeably and have the same meaning.

As used herein the terms "kneading element" and "kneading block" are used interchangeably and have the same meaning.

"Catalyst system" as used herein refers to the catalyst or catalysts that catalyze the hydrolysis of carbonate linkages in polycarbonate undergoing extruder devolatilization in the presence of water.

"Catalytically effective amount" refers to the amount of the catalyst at which catalytic performance is exhibited.

As used herein, the term "molecular weight adjustment" refers to the reduction of the molecular weight of a polymer by catalyst mediated polymer chain scission, said reduction of molecular weight occurring during the extrusion of the polymer. Molecular weight adjustment is illustrated by the partial hydrolysis of polycarbonate which occurs when wet polycarbonate is subjected to extrusion devolatilization in the presence of a hydrolysis catalyst.

As used herein the term "containing a substantial amount of water" means containing about 1 percent by weight of water or more. For example, a polymeric material containing between about 1 and about 20 percent by weight water is said to contain a substantial amount of water.

As used herein, the term a "substantially free of water" means containing less than about 0.5 percent by weight water. For example, a polycarbonate which is substantially free of water contains less than about 0.5 percent by weight water.

As used herein the terms "wet polycarbonate powder" and "wet polycarbonate" refer to solid polycarbonate containing a substantial amount of water as defined herein.

As used herein the term "olefin polymer" refers to polymers comprising structural units derived from olefinic species via polymerization. The polymer ABS is an example of an olefin polymer as used herein in that it represents a polymer comprising structural units derived from the polymerization of the olefinic species, acrylonitrile; 1,3-butadiene; and styrene.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

The present invention provides a method for the removal of volatile components present in solid polymeric materials. The method of the present invention has been found to be particularly useful when the solid polymeric material contains a substantial amount of water, for example between about 1 percent by weight and about 20 percent by weight water.

According to the method of the present invention a solid polymeric material containing water and optionally, one or more other volatile components, such as one or more solvents, is introduced into an extruder comprising a primary kneading and melting section consisting essentially of forward flighted kneading elements and optionally, forward flighted conveying elements. The solid polymeric material may be a single polymeric material, for example bisphenol A polycarbonate, or may be a mixture of polymeric materials, for example a blend of bisphenol A polycarbonate with an olefin polymer such as ABS. Polymeric materials which may be "devolatilized" using the method of the present invention include polycarbonates, polyphenylene ethers, polyamides, polyesters, polyimides, polyetherimides, polyethersulfones, olefin polymers, and mixtures thereof. The method of the present invention is especially well suited to the removal of volatile components of polycarbonates. Typically, the polymeric material undergoing extruder devolatilization according to the method of the present invention comprises between about 1 and about 20 percent by weight water, and between about 0.001 and about 5 percent by weight organic solvent.

Polycarbonates which may be treated according to the method of the present invention to provide polycarbonate compositions comprising reduced levels of volatile components following extrusion devolatilization include polycarbonates comprising repeat units having structural units I

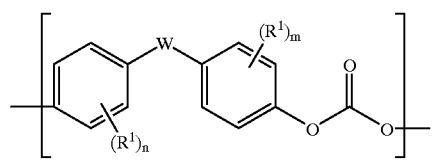

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof. Bisphenol A polycarbonate is preferred.

Polycarbonates comprising repeat units having structure I are typically prepared by the interfacial polymerization reaction of one or more bisphenols with phosgene in the presence of an acid acceptor such as sodium hydroxide and a phase transfer catalyst such as a quaternary ammonium salt. Bisphenols suitable for use in the preparation of polycarbonates comprising repeat units having structure I include bisphenol A; 2,2-bis(4-hydroxy-3-methylphenyl) propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl) cyclohexane; 1,1-bis(4-hydroxy-3-methylphenyl) cyclohexane; and 1,1-bis(4-hydroxyphenyl)-3,3,5-trimethylcyclohexane. Bisphenol A is typically preferred.

The extruder may be any extruder capable of kneading and melting the polymeric material being subjected to extrusion devolatilization, for example a co-rotating, intermeshing double screw extruder; a counter-rotating, non-intermeshing double screw extruder; a single screw reciprocating extruder; or a single screw non-reciprocating extruder.

The extruder comprises an open primary kneading and melting section consisting essentially of forward flighted kneading elements and optionally, of forward flighted conveying elements. Such a screw design avoids the formation of a melt seal by avoiding the use of the reverse-flighted screw elements or dam rings, and allows volatile components present in the polymeric material to move forward continuously to vacuum vents located downstream of the primary kneading and melting section. An open primary kneading and melting section facilitates both melting of the solid polymeric material and down-channel flow of steam generated as the wet polymeric material is heated and sheared above its glass transition temperature. The steam is then removed through downstream vacuum vents.

The extruder typically comprises between about 5 and about 10 barrels. In instances wherein the extruder comprises a single barrel, the extruder typically has a length to diameter ratio (L/D ratio) of between about 20 and about 60. Longer extruders, those having more barrels or simply having a larger L/D ratio as in the case of single barrel extruders, are frequently better suited to the incorporation of additional melt kneading sections and vacuum vents. Longer extruders may in some embodiments of the present invention provide a greater degree of volatile component removal from the polymeric material being subjected to extrusion devolatilization.

The extruder is typically operated such that extruder "set" temperatures are in a temperature range between about 150° C. and about 400° C., preferably between about 200° C. and about 350° C. Typically the melt temperature of the polymeric material within the extruder will be somewhat higher than the extruder set temperature and will be in a range between about 200° C. and about 450° C., preferably between about 300° C. and about 370° C.

The feed rate and the screw speed of the extruder are controlled to provide the maximum extruder power utilization possible, subject to normal operating limitations such as the maximum melt temperature a polymeric material may be subjected to without its undergoing degradation. Extruder power utilization is dependent upon both extruder torque and screw speed. In one embodiment of the present invention the extruder power utilization is in a range between about 50 and about 100 percent, preferably between about 80 and about 95 percent of the maximum power available. The screw speed is typically in a range between about 50 and about 100 percent of the maximum screw speed achievable. The maximum achievable screw speed varies from machine to machine but is typically in a range between about 200 and about 1200 revolutions per minute (rpm), and in one embodiment of the present invention the screw speed is between about 300 and about 600 rpm.

A vacuum vent downstream of the primary kneading and melting section of the extruder is referred to as "the first vacuum vent" and is characterized by the fact that all of the screw elements present in the extruder between the point of introduction of the solid polymeric material at the feed throat and said first vacuum vent are "right handed" (forward flighted) screw elements. The first vacuum vent is preferably operated at a pressure between about 1 and about 750 torr, and still more preferably in a range between about 1 and about 500 torr. The vacuum applied at the first vacuum vent provides a driving force for the downstream flow of steam generated in the primary kneading and melting section. Generally, excessive vacuum should be avoided in the operation of the first vacuum vent in order to avoid the escape of polymeric material through said vacuum vent.

Generally, it is preferable that the extruder be operated in a manner such that a substantial portion of the volatile components present in the starting polymeric material are removed through the first vacuum vent. The amount of the volatile components being removed at the first vacuum vent may be regulated by controlling the feed rate of the solid polymeric material, the screw design, extruder operating parameters such as screw speed and temperature, and the pressure at which the vacuum vents are operated. The removal of "a substantial portion of the volatile components" at the first vacuum vent means that at least about 50 percent, preferably at least about 80 percent of the volatile components of the starting solid polymeric material are removed through the first vacuum vent.

The extruder is equipped, according to the method of the present invention, with a second vacuum vent located downstream of the secondary kneading section. The second vacuum vent serves to remove additional volatile components not removed through the first vacuum vent. Typically the second vacuum vent is operated at a pressure lower than the pressure at which the first vacuum vent is operated. The pressure at which the second vacuum vent is operated is typically in a range between about 1 and about 500 torr, preferably between about 1 and about 250 torr. In one embodiment of the present invention the extruder comprises at least one additional vacuum vent in addition to the first and second vacuum vents, said additional vacuum vent being located downstream of said second vacuum vent, said additional vacuum vent being operated at a pressure between about 1 and about 500 torr, preferably between about 10 and about 250 torr. The molten polymer present in the extruder between the first and second vacuum vents is referred to as the partially devolatilized polymer melt.

Once a substantial portion of the volatile components have been removed at the first vacuum vent the molten polymeric material is subjected additional kneading and mixing in at least one secondary kneading section located downstream of said first vacuum vent. The secondary kneading section may comprise forward flighted screw elements, reverse flighted screw elements, neutral screw elements, dam rings, distributive mixing elements such as TME's (turbine mixing elements) and ZME's ("zahnmisch" elements), or combinations thereof. TME's and ZME's are available from the Werner & Pfleiderer Corporation. The use of secondary kneading sections comprising reverse flighted screw elements, neutral screw elements, dam rings, or combinations thereof typically results in the formation of a melt seal. The extruder may be equipped for multistage stripping agent injection and venting at locations downstream of said melt seal in order to facilitate the removal of persistent volatile components that may present. Persistent volatile components are exemplified by residual monomers, such as bisphenol A, and high boiling by-products formed during the preparation of the polymeric material, for example, diphenyl carbonate formed as a by-product during the interfacial preparation of bisphenol A polycarbonate using phenol as an endcapping agent.

Additives such as flame retardants, heat stabilizers, light stabilizers, pigments, dyes, fillers, plasticizers, impact modifiers, and the like may be added during the extrusion devolatilization process. These are preferably introduced into the polymer melt downstream of the first vacuum vent in order to minimize the loss of said additives through said first vacuum vent. In addition, other polymer resins, such as the olefin polymer ABS, the polyester PBT, and the like may be introduced into the at extruder to afford polymer blends.

The method of the present invention is especially useful for the removal of volatile components present in wet polycarbonate powder isolated following the interfacial polymerization of bisphenol A and phosgene, but may be also be used for the removal of volatile components present in other polymeric materials. For example, the method of the present invention applies to the removal of volatile components from polymer powders containing a substantial amount of volatile substances, for example polyphenylene ether powders isolated from a solvent such as toluene or a non-solvent such as methanol and containing from about 1 to about 20 percent by weight residual solvent or non-solvent.

As mentioned, in one embodiment the present invention may be adapted to include other operations involving the polymeric material, such as blending with other polymers, functionalization by chemical reaction, and controlled molecular weight adjustment. In the case of controlled molecular weight adjustment, it would be desirable to prepare a variety of lower molecular weight grades of polycarbonate from a single grade of higher molecular weight polycarbonate. Polycarbonate has been subjected to controlled molecular weight reduction by extrusion of dry polycarbonate powder in the presence of a hydrolysis catalyst, such as tetrabutyl phosphonium hydroxide. A small amount of water is introduced into the extruder in order achieve useful rates of hydrolysis and thereby obtain lower molecular weight polycarbonate. The process must be carefully controlled such that polycarbonate having both the desired molecular weight and an a narrow molecular weight distribution is obtained.

Extrusion devolatilization of wet polycarbonate according to the method of the present invention in the presence of a hydrolysis catalyst, such as tetrabutyl ammonium hydroxide or tetrabutyl phosphonium hydroxide, results in a controlled downward adjustment of the polycarbonate molecular weight. The degree to which the polycarbonate molecular weight is decreased is a function of the amount of catalyst employed. Although any chemical compound or mixture of compounds which increases the rate of hydrolysis of carbonate units may be employed, quaternary ammonium salts, quaternary phosphonium salts, and mixtures thereof are especially effective catalysts for the controlled molecular weight adjustment of polycarbonate during extruder devolatilization according to the method of the present invention. Suitable hydrolysis catalysts include quaternary ammonium hydroxides having structure II

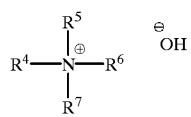

II wherein each of $R^4$–$R^7$ is independently a $C_1$–$C_{20}$ alkyl radical, $C_4$–$C_{20}$ cycloalkyl radical or a $C_4$–$C_{20}$ aryl radical. Suitable quaternary ammonium hydroxides include tetramethyl ammonium hydroxide, tetrabutyl ammonium hydroxide, phenyl trimethyl ammonium hydroxide, and the like.

Suitable hydrolysis catalysts also include quaternary phosphonium hydroxides having structure III

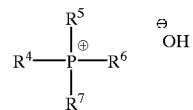

III wherein $R^4$–$R^7$ are defined as in structure II. Suitable quaternary phosphonium catalysts include tetramethyl phosphonium hydroxide, tetrabutyl phosphonium hydroxide, decyl trimethyl phosphonium hydroxide, phenyl trimethyl phosphonium hydroxide, and the like.

Typically, the amount of hydrolysis catalyst employed during the controlled molecular weight adjustment of polycarbonate is in a range between about 10 and about 300, preferably between about 25 and about 50 parts per million based upon the weight of the wet polycarbonate introduced into the extruder. The catalyst may be pre-mixed with the wet polycarbonate powder or added independently of the polycarbonate via the feed throat or at some other point along the extruder.

Although this aspect of the method of the present invention may be used to effect the controlled hydrolysis and thereby the controlled molecular weight reduction of any polycarbonate, for example polycarbonates comprising structural units I, the method is especially well suited to the controlled molecular weight reduction of bisphenol A polycarbonate. Polycarbonates which have been subjected to controlled molecular weight reduction according to the method of the present invention are found to comprise less than about 0.5 weight percent water. Polycarbonates comprising methylene chloride prior to being subjected to controlled molecular weight reduction during the extruder devolatilization process afford lower molecular weight polycarbonates upon extruder devolatilization in the presence of a hydrolysis catalyst according to the method of the present invention and contain less than about 1 part per million methylene chloride.

In another aspect of the present invention, a solid polymeric material comprising water and optionally, one or more volatile organic compounds is introduced into an extruder together with at least one additional polymer, said extruder being equipped according to the method of the present invention. For example, a wet polycarbonate powder comprising structural units I and further comprising about 10 percent by weight water and about 100 parts per million methylene chloride may be introduced together with an additional polymer into an extruder equipped according to the method of the present invention and subjected to extruder devolatilization. The polymeric composition recovered from the extruder contains less than about 0.5 weight percent water. The polymeric composition recovered may be a miscible polymer blend, a partially miscible polymer blend or a highly phase separated polymer mixture.

The additional polymer introduced during the extruder devolatilization process may itself comprise water and one or more volatile organic compounds, or may be substantially free of water and contain only very low levels of volatile organics. The additional polymer may be one or more polycarbonates, polyphenylene ethers, polyamides, polyesters, polyimides, polyetherimides, polyether sulfones, olefin polymers or mixtures thereof. In one embodiment of the present invention, the additional polymer is a polycarbonate comprising structural units I. In an alternate embodiment of the present invention the additional polymer is an olefin polymer, for example, acrylonitrile-butadiene-styrene rubber (ABS).

FIG. 1 illustrates an extruder configured according to the method of the present invention. Wet solid polymeric material (010) is introduced into the feed throat (020) of an extruder (030). The wet solid polymeric material is conveyed from the feed throat to a primary kneading and melting section (040) consisting essentially of forward flighted kneading elements and optionally, forward flighted conveying elements, where it is heated and sheared to give a polymer melt comprising water. Water is removed from the polymer melt at a first vacuum vent (050) to give a partially devolatilized polymer melt. As a consequence of the forward flighted screw elements in the primary kneading and melting section, steam formed as the polymeric material melts in the primary kneading and melting section passes down the extruder screws towards the first vacuum and not upstream towards the feed throat. The vacuum applied at the first vacuum vent provides an additional driving force for the downstream movement of steam generated as the wet solid polymeric material is heated above the boiling point of water. The partially devolatilized polymer melt then passes through a secondary melt kneading section (060) and past a second vacuum vent (070), additional water being removed at said second vacuum vent.

Figure 2:
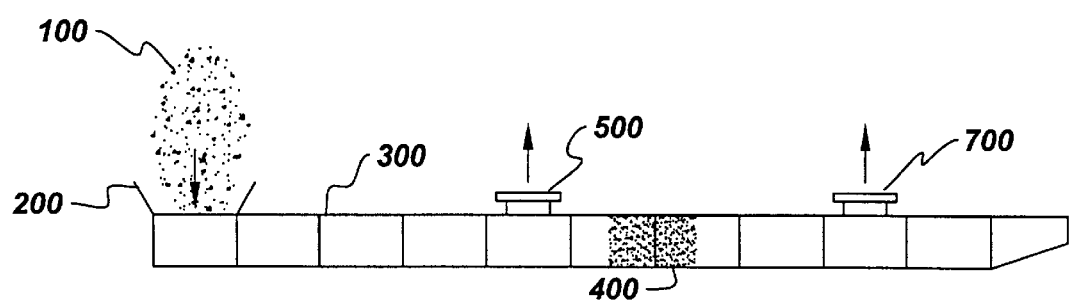
FIG. 2 illustrates an alternate extruder configuration.

FIG. 2 illustrates an alternate extruder configuration. Wet polymeric material (100) is introduced through a feed throat (200) into an extruder (300) equipped with a vacuum vent (500) upstream of a primary kneading and melting section (400). The extruder further comprises a second vacuum vent (600) located downstream of the primary kneading and melting section.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C. Screw elements are designated using the conventional (Werner and Pfleiderer) shorthand notation. In the Examples and Comparative Examples which follow, unless otherwise noted, the term polycarbonate refers to bisphenol A polycarbonate. Feed rates reflect the weight of the material introduced into the extruder, for wet polycarbonate the weight of the polymer and water. Feed rates are not corrected to reflect only the amount of polymer introduced.

Examples 1–4 and Comparative Examples 1–3

Polycarbonate resin powders containing between about 8 and about 20 weight percent water were used as the raw materials. A 30 mm, co-rotating intermeshing, 7-barrel, twin screw extruder possessing a single feed throat was used for the extrusion devolatilization process. The extruder was divided into 4 heating zones with the following set temperature profile: 140° C. (barrel 2), 260° C. (barrel 3), 300° C. (barrels 4 and 5), and 300° C. (barrels 6 and 7). Typically, the melt temperature was in a range between about 300° C. and about 370° C.

The wet bisphenol A polycarbonate powders were introduced at the feed throat which was located on the first barrel. A significant portion of the wet powder was kneaded and melted in the primary kneading and melting section which comprised only forward-flighted (i.e., right-handed pitch) kneading elements and optionally, only forward flighted conveying elements, located between 7 to 12 diameters (barrels 3 and 4) downstream of the feed throat. The screw elements in the kneading and melting section were two 45/5/20 kneading blocks (staggering angle 45°, 5 disks, 20 mm in length), one 45/5/42 kneading block, followed by two 45/5/20 kneading blocks. The steam released as the polycarbonate was kneaded and heated above its glass transition temperature was vented through a first vacuum vent located at barrel 5. The vacuum vent at barrel 5 was typically operated at a pressure between about 650 and about 755 torr. Most of the water initially present in the polymer was removed through the first vacuum vent. Beyond the first vacuum vent, the polymer melt passed through a secondary kneading section consisting of both forward and reverse-flighted (i.e., left-handed pitch) conveying and kneading elements located between 16 to 18 diameters (barrel 6) downstream of the feed throat on barrel 1. A second vacuum vent was located at barrel 7 and was operated at a pressure below about 125 torr. In Examples 1–4 the extruder was operated at about 90% of the maximum torque. The data in Table 1 demonstrate that the screw design of the method of the present invention provides for a rapid throughput of polymer with throughput rates between about 35 and about 52 pounds of polymer per hour. The polymer compositions obtained following extrusion devolatilization were analyzed for water content by thermal gravimetric analysis.

In Tables 1 and 2 the column heading "Kneading/Melting Screw Design" indicates the screw designed employed in the primary kneading and melting section of the extruder. In screw design "A" the primary kneading and melting section consisted of two 45/5/20 kneading blocks (staggering angle 45°, 5 disks, 20 mm in length), one 45/5/42 kneading block, followed by another two 45/5/20 kneading blocks. In screw design "B" the primary kneading and melting section consisted of in sequence: one 45/5/20 kneading block (staggering angle 45°, 5 disks, 20 mm in length), a single 20/20 conveying element, one 45/5/20 kneading block, and a blister ring. The column heading "Moisture Level" in Tables 1 and 2 indicates the amount of water present in the starting polycarbonate and is expressed as percent by weight. The following column headings likewise apply to Tables 1 and 2. "Screw Speed" is expressed in revolutions per minute (rpm). The column heading "P Vacuum Vent No.1" indicates the pressure expressed in torr at which the first vacuum vent was operated. The column heading "P Vacuum Vent No. 2" indicates the pressure expressed in torr at which the second vacuum vent was operated. "Torque %" indicates the percentage of the maximum available torque. "Feed Rate" is expressed in pounds per hour and represents the maximum achievable throughput. The designation "LH" used in screw designs C and D (Table 1) indicates a left handed (i.e., reverse flighted) screw element.

TABLE 1

| Example No. | Kneading/Melting Screw Design[1] | Moisture Level | Screw Speed | P Vacuum Vent No. 1 | P Vacuum Vent No. 2 | Torque % | Feed Rate |
|---|---|---|---|---|---|---|---|
| 1 | A | 12 | 300 | 750 | 150 | 90 | 40 |
| 2 | A | 12 | 500 | 710 | 150 | 92 | 50 |
| 3 | A | 20 | 300 | 710 | 150 | 90 | 35 |
| 4 | A | 20 | 500 | 735 | 250 | 90 | 52 |
| CE-1 | B | 12 | 300 | <20 | <20 | 75 | 25 |
| CE-2 | C | 8 | 300 | 760 | 50 | 62 | 25 |
| CE-3 | D | 12 | 300 | 760 | <20 | 69 | 25 |

[1]Kneading/Melting Screw design A: KB 45/5/20, KB 45/5/20, KB 45/5/42, KB 45/5/20, KB 45/5/20.
Kneading/Melting Screw design B: KB 45/5/20, 20/20, KB 45/5/20, blister ring.
Kneading/Melting Screw design C: KB 45/5/14, KB 45/5/14 LH.
Kneading/Melting Screw design D: KB 45/5/20, KB 90/5/28, KB 45/5/14 LH.

In Comparative Example 1 (CE-1) an extruder was employed which was identical to that used in Examples 1–4 with the exception of the screw elements used in the primary kneading and melting section which comprised a blister ring (dam ring). Wet polycarbonate powder was introduced into the feed throat of the extruder configured as shown in FIG. 1 and extruder devolatilization was carried out. The first and second vacuum vents were each operated at a pressure of less than 20 torr. The operating temperatures of the extruder were the same as those employed in Examples 1–4. The maximum polymer throughput was limited to 25 pounds per hour due to significant amounts of steam which emerged from the feed throat and caused powder bridging at the feed throat. At this point, the extruder was not operable and had to be shut down. At the maximum throughput, which corresponded to a feed rate of 25 pounds per hour, the torque was only 75% of the maximum available torque.

In Comparative Examples 2–3 a 30 mm, co-rotating, intermeshing, 10-barrel, twin screw extruder configured as in FIG. 2 was used for the extrusion devolatilization process. The extruder was divided into 4 heating zones with the following set temperature profile: barrel 1 (unheated), 80° C. (barrels 2, 3, and 4), 250° C. (barrel 5 and 6), 300° C. (barrels 7 and 8), and 300° C. (barrels 9 and 10). The temperature of the polymer melt was 292° C. and 345° C. respectively for Comparative Examples 2 and 3. The wet polycarbonate powders were fed to the extruder at barrel 1. The screw elements in the kneading section located between 16 to 21 diameters (barrels 6 and 7) downstream of the feed throat comprised at least one reverse-flighted (left-handed) kneading block, as listed in Table 1. A vent located at barrel 5 was operated at atmospheric pressure. A second vent (Vacuum Vent No. 2) located at barrel 9 was operated at subatmopsheric pressure as indicated in Table 1. The maximum throughput without a significant amount powder escaping from the vent at barrel 5 or powder bridging in the feed throat was about 25 pounds per hour. The torque utilization was only 62% and 69% of maximum torque in Comparative Examples 2 and 3 respectively.

Examples 5–7 and Comparative Examples 4–6

In Examples 5–7, polycarbonate resin powder containing 6 to 12 percent by weight water was subjected to extrusion devolatilization on a 40 mm, co-rotating, intermeshing, 10-barrel, twin screw extruder comprising a feed throat at barrel 1. The extruder was divided into 9 heating zones with the following set temperature profile: 204° C. (Zone 1), 260° C. (Zone 2), 271° C. (Zone 3), 277° C. (Zone 4), 282° C. (Zone 5), 288° C. (Zone 6), 293° C. (Zone 7), 299° C. (Zone 8), 304° C. (Zone 9), 304° C. (die). The polymer melt temperature was in a range between about 300° C. and about 370° C. The extruder screws were configured to provide a primary kneading and melting section consisting of forward-flighted kneading elements located between 13 to 20 diameters downstream of the feed throat (barrels 4 and 5). The screw elements used in this primary kneading and melting section were two 45/5/40 kneading blocks and one 45/5/60 kneading block. The steam released due to the kneading and melting of the moist polycarbonate was vented through a first vacuum vent located at barrel 6. After a substantial portion of the water was removed through the first vacuum vent, the polymer melt passed through a secondary kneading section consisting of both forward and reverse-flighted (i.e., left-handed pitch) screw and kneading elements. A second vacuum vent located downstream of the secondary kneading and melting section effected the removal of additional water and was operated at a pressure of about 125 torr or less.

TABLE 2

| Example No. | Kneading/Melting Screw Design[1] | Moisture Level | Screw Speed | P Vacuum Vent No. 1 | P Vacuum Vent No. 2 | Torque % | Feed Rate |
|---|---|---|---|---|---|---|---|
| 5 | E | 6 | 500 | 635 | 120 | 85 | 210 |
| 6 | E | 6 | 300 | 635 | 120 | 85 | 187 |
| 7 | E | 12 | 500 | 380 | 120 | 85 | 180 |
| CE-4 | F | 6 | 300 | 250 | 125 | 45 | 70 |
| CE-5 | F | 6 | 500 | 250 | 125 | 56 | 105 |
| CE-6 | F | 12 | 500 | 250 | 127 | 52 | 85 |

[1]Kneading/Melting Screw design E: KB 45/5/40, KB 45/5/40, KB 45/5/60.
Kneading/Melting Screw design F: KB 45/5/40, KB 45/5/60, TME-1, TME-2, TME-3.

In Comparative Examples 4–6 polycarbonate powder containing between about 6 and about 12 percent by weight water was subjected to extruder devolatilization. The extruder used and the operating conditions employed were the same as those used in Examples 5–7, except as noted, and with the exception that the screw elements in the primary kneading and melting section were constituted as follows: one 45/5/40 kneading block, one 45/5/60 kneading block, and three turbine mixing elements (TME) each of said TME's having a 22.5° angle and a length of 20 millimeters. Turbine mixing elements are available from the Werner & Pfleiderer Corporation and are essentially slotted blister-rings. The first vacuum vent was operated at a pressure in a range between about 250 torr. The second vacuum vent was operated at a pressure of about 125 torr. The results are summarized in Table 2. The data show that the use of the more restrictive TME elements in the primary kneading and melting section allows only a very low maximum throughput (See "Feed Rate" Table 2) compared to those observed for Examples 5–7 (See "Feed Rate" Table 2) in which an "open" primary kneading and melting screw design was used.

Example 8

Bisphenol A polycarbonate resin powder containing 7.1 percent by weight water was subjected to extruder devolatilization on a 58 mm, co-rotating, intermeshing, 8-barrel, twin screw extruder possessing two vacuum vents. The screw elements of the extruder were configured such that only forward flighted screw elements were used upstream of the first vacuum vent. The extruder was divided into 7 heating zones with the following set temperature profile: 218° C. (Zone 1), 260° C. (Zone 2), 271° C. (Zone 3), 288° C. (Zone 4), 293° C. (Zone 5), 299° C. (Zone 6), 304° C. (Zone 7), and 304° C. (die). The temperature of the polymer melt was in a range between about 300° C. and about 370° C. The wet polycarbonate powder was introduced into the extruder through a feed throat located on barrel 1. The screw elements were configured to provide a primary kneading and melting section upstream of the first vacuum vent said primary kneading and melting section consisting of two 45/5/60 kneading blocks and one 45/5/80 kneading block. Most of the steam released due to the action of the primary kneading and melting section was vented through the first vacuum vent which was located at barrel 5. The first vacuum vent was operated a pressure of about 500 torr. The polymer melt was then passed through a secondary kneading section consisting of both forward and reverse-flighted kneading elements. A second vacuum vent was located downstream of the secondary kneading section and was operated at a pressure of about 250 torr. A maximum throughput of 1030 pounds per hour was achieved at a screw rotation speed of 600 rpm. Under these conditions the percent of the maximum torque utilized was 82 percent.

The polycarbonate obtained in Examples 1–8 following extruder devolatilization contained between about 0.1 and about 0.3 percent by weight water, an amount of water closely approximating the equilibrium concentration of water in dry polycarbonate powder. The data give for Examples 1–8 illustrates the effectiveness of the present invention at rapidly drying polycarbonate powders containing substantial amounts of water.

Example 9

A mixture of 1000 pounds of wet bisphenol A polycarbonate powder having a weight average molecular weight of about 30,000 daltons (as determined by gel permeation chromatography against polystyrene standards) containing 10 percent by weight water, methylene chloride (10 parts per million based on the total weight of wet polycarbonate employed), and tetrabutyl phosphonium hydroxide (50 parts per million based on the total weight of wet polycarbonate employed) is prepared in a Henschel mixer and the mixture is fed as a powder to a 58 mm, co-rotating, intermeshing, 8 barrel, twin screw extruder which is equipped and operated as in Example 8. The mixture is extruded at a maximum throughput of about 1030 pounds per hour at about 600 rpm. The percent utilization of the maximum available torque is in a range between about 70 and about 95 percent. A product polycarbonate having a weight average molecular weight in a range between about 15,000 and about 28,000 daltons is produced, said product polycarbonate comprising less than 0.5 percent by weight water and less than 1 part per million methylene chloride.

Example 10

A mixture of 1111 pounds of wet bisphenol A polycarbonate powder having a weight average molecular weight of about 25,000 daltons (as determined by gel permeation chromatography against polystyrene standards) containing 10 percent by weight water and 10 parts per million methylene chloride is mixed with 1000 pounds of dry 1,1-bis-(4-hydroxy-3-methyl)cyclohexane polycarbonate (BCC polycarbonate) powder having a weight average molecular weight of about 25,000 daltons (as determined by gel permeation chromatography against polystyrene standards) and the mixture is fed as a powder to a 58 mm, co-rotating, intermeshing, 8 barrel, twin screw extruder which is equipped and operated as in Example 8. The mixture is extruded at a maximum throughput of about 1030 pounds per hour at about 600 rpm. The percent utilization of the maximum available torque is in a range between about 70 and about 95 percent. A polycarbonate blend comprising bisphenol A polycarbonate and BCC polycarbonate is produced, said blend comprising less than 0.5 percent by weight water and less than 1 part per million methylene chloride, said blend having a Tg of between 132 and 140° C.

The invention has been described in detail with particular reference to preferred embodiments thereof, but it will be understood by those skilled in the art that variations and modifications can be effected within the spirit and scope of the invention.

What is claimed is:

1. A method for removing volatile components from a solid polymeric material, said method comprising:

Step (A) introducing a solid polymeric material comprising water into an extruder, said extruder comprising;
 (i) a primary kneading and melting section, said primary kneading and melting section consisting essentially of forward flighted kneading elements and optionally, forward flighted conveying elements;
 (ii) a first vacuum vent located downstream of said primary kneading and melting section;
 (iii) a secondary melt kneading section located downstream of the first vacuum vent; and
 (iv) a second vacuum vent located downstream of said secondary melt kneading section;

Step (B) heating and shearing said polymeric material in said primary kneading and melting section to form a polymer melt comprising water;

Step (C) removing a portion of the water from the polymer melt through said first vacuum vent to form a partially devolatilized polymer melt;

Step (D) subjecting the partially devolatilized polymer melt to additional melt kneading in a secondary melt kneading section; and Step (E) removing an additional amount of water from the partially devolatilized polymer melt at said second vacuum vent.

2. A method according to claim 1 wherein said polymeric material is selected from the group consisting of polycarbonates, polyphenylene ethers, polyamides, polyesters, polyimides, polyetherimides, polyethersulfones, olefin polymers, and mixtures thereof.

3. A method according to claim 1 wherein said polymeric material comprising water further comprises one or more volatile organic compounds, said volatile organic compounds comprising one or more solvents.

4. A method according to claim 3 wherein said organic solvents comprise methylene chloride.

5. A method according to claim 3 wherein the polymeric material comprises between about 0.1 and about 20 percent by weight water, and between about 0.001 to about 5 percent by weight of one or more organic solvents.

6. A method according to claim 1 wherein the extruder is a twin screw, co-rotating extruder.

7. A method according to claim 1 wherein the extruder further comprises between about 5 and about 10 barrels.

8. A method according to claim 1 wherein the extruder is operated in a temperature range between about 150° C. and about 400° C.

9. A method according to claim 1 wherein Step (B) comprises heating the polymer melt at a temperature in a range between about 200° C. and about 400° C.

10. A method according to claim 1 wherein said first and second vacuum vents are operated in a range between about ambient pressure and about 1 torr, said second vacuum vent being operated at a pressure lower than that at which said first vacuum vent is operated.

11. A method according to claim 1 wherein the extruder further comprises at least one additional vacuum vent.

12. A method according to claim 1 wherein said primary kneading and melting section comprises two or more forward flighted kneading blocks.

13. A method according to claim 1 wherein said secondary melt kneading section comprises both forward and rearward flighted screw elements.

14. A method according to claim 1 wherein said secondary kneading section comprises at least one distributive mixing element.

15. A method according to claim 1 further comprising recovering a polymer composition which is substantially free of water.

16. A method according to claim 15 wherein said polymer composition contains less than about 0.5 percent by weight water and less than about 1 part per million methylene chloride.

17. A method according to claim 1 wherein said polymeric material is a polycarbonate comprising structural units I

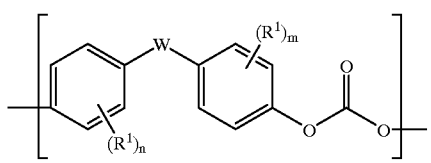

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

18. A method according to claim 17 wherein Step (A) further comprises introducing a hydrolysis catalyst into the extruder.

19. A method according to claim 18 wherein the hydrolysis catalyst is a quaternary ammonium hydroxide, a quaternary phosphonium hydroxide, or a mixture thereof.

20. A method according to claim 18 wherein the hydrolysis catalyst is a quaternary ammonium hydroxide having structure II

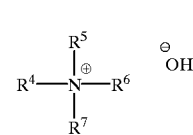

wherein each of $R^4$–$R^7$ is independently a $C_1$–$C_{20}$ alkyl radical, $C_4$–$C_{20}$ cycloalkyl radical or a $C_4$–$C_{20}$ aryl radical.

21. A method according to claim 18 wherein the hydrolysis catalyst is a phosphonium hydroxide having structure III

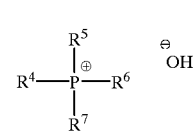

wherein each of $R^4$–$R^7$ is independently a $C_1$–$C_{20}$ alkyl radical, $C_4$–$C_{20}$ cycloalkyl radical or a $C_4$–$C_{20}$ aryl radical.

22. A method according to claim 18 further comprising recovering a polycarbonate having a lower molecular weight than the polycarbonate introduced into the extruder.

23. A method according to claim 22 wherein the hydrolysis catalyst is introduced in an amount corresponding to between about 10 and about 300 parts per million based upon the weight of the polycarbonate introduced into the extruder.

24. A method according to claim 22 wherein the polycarbonate recovered from the extruder comprises less than about 0.5 percent by weight water and less than about 1 part per million methylene chloride.

25. A method according to claim 18 wherein the polymeric material comprises bisphenol A polycarbonate.

26. A method according to claim 1 wherein Step (A) further comprises introducing at least one additional polymer into the extruder.

27. A method according to claim 26 wherein said additional polymer is selected from the group consisting of polycarbonates, polyphenylene ethers, polyamides, polyesters, polyimides, polyetherimides, polyethersulfones, olefin polymers, and mixtures thereof.

28. A method according to claim 26 wherein said additional polymer is a polycarbonate.

29. A method according to claim 28 wherein said solid polymeric material comprising water is bisphenol A polycarbonate and said additional polymer is a polycarbonate comprising structural units I

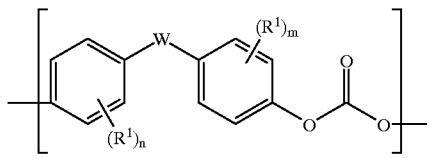

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

30. A method according to claim 29 wherein said additional polymer is 1,1-bis(3-methyl-4-hydroxyphenyl)cyclohexane polycarbonate.

31. A method according to claim 26 wherein said additional polymer is ABS.

32. A method for removing volatile components from a solid polymeric material, said method comprising:
Step (A) introducing a solid polymeric material comprising water into an extruder, said extruder having a feed rate at which said polymeric material is introduced into the extruder, said extruder having a screw speed, said extruder having a power utilization and a maximum power utilization, said extruder comprising;
  (i) a primary kneading and melting section, said primary kneading and melting section consisting essentially of forward flighted kneading elements and optionally, forward flighted conveying elements;
  (ii) a first vacuum vent located downstream of said primary kneading and melting section;
  (iii) a secondary melt kneading section located downstream of the first vacuum vent; and
  (iv) a second vacuum vent located downstream of said secondary melt kneading section;
Step (B) heating and shearing said polymeric material in said primary kneading and melting section to form a polymer melt comprising water;
Step (C) removing a portion of the water from the polymer melt through said first vacuum vent to form a partially devolatilized polymer melt;
Step (D) subjecting the partially devolatilized polymer melt to additional melt kneading in a secondary melt kneading section;
Step (E) removing an additional amount of water from the partially devolatilized polymer melt at said second vacuum vent; and
Step (F) controlling the screw speed and feed rate such that the extruder power utilization is between about 50 and about 100 percent of s aid maximum power utilization.

33. A method according to claim 32 wherein said polymeric material is selected from the group consisting of polycarbonates, polyphenylene ethers, polyamides, polyesters, polyimides, polyetherimides, polyethersulfones, olefin polymers, and mixtures thereof.

34. A method according to claim 32 wherein said polymeric material is a polycarbonate comprising structural units I

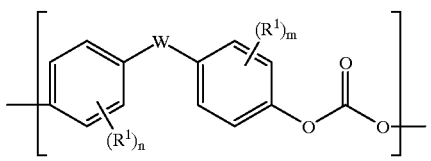

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$, aralkyl, $C_5$–$C_{20}$ cycloalkyl groups or a combination thereof.

35. A method according to claim 34 wherein the polymeric material comprises bisphenol A polycarbonate.

36. A method according to claim 32 wherein said polymeric material further comprises one or more volatile organic compounds, said volatile organic compounds comprising at least one organic solvent.

37. A method according to claim 36 wherein said organic solvent comprises methylene chloride.

38. A method according to claim 32 wherein the polymeric material comprises between about 0.1 and about 20 percent by weight water, and further comprises between about 0.001 to about 5 percent by weight of one or more organic solvents.

39. A method according to claim 32 wherein the extruder is a twin screw, co-rotating extruder.

40. A method according to claim 32 wherein the extruder further comprises between about 5 and about 10 barrels.

41. A method according to claim 32 wherein the extruder is operated in a temperature range between about 150° C. and about 400° C.

42. A method according to claim 32 wherein Step (B) comprises heating and shearing the polymer melt at a temperature in a range between about 200° C. and about 400° C.

43. A method according to claim 32 wherein said first and second vacuum vents are operated in a range between about ambient pressure and about 1 torr said second vacuum vent being operated at a pressure lower than that at which said first vacuum vent is operated.

44. A method according to claim 32 wherein the extruder further comprises at least one additional vacuum vent.

45. A method according to claim 32 wherein said primary kneading section comprises two or more forward flighted kneading blocks.

46. A method according to claim 32 wherein said secondary melt kneading section comprises both forward and rearward flighted screw elements.

47. A method according to claim 32 wherein said secondary kneading section comprises at least one distributive mixing element.

48. A method according to claim 32 further comprising recovering a polymer composition which is substantially free of water.

49. A method according to claim 48 wherein said polymer composition contains less than about 0.5 percent by weight water and less than about 1 part per million methylene chloride.

50. A method for removing water and methylene chloride from bisphenol A polycarbonate powder, said method comprising:

Step (A) introducing said bisphenol A polycarbonate comprising water and methylene chloride into an extruder, said extruder comprising;
(i) a primary kneading and melting section, said primary kneading and melting section consisting essentially of forward flighted kneading elements and optionally, forward flighted conveying elements;
(ii) a first vacuum vent located downstream of said primary kneading and melting section;
(iii) a secondary melt kneading section located downstream of the first vacuum vent; and
(iv) a second vacuum vent located downstream of said secondary kneading section;

Step (B) heating and shearing said bisphenol A polycarbonate in said primary kneading and melting section to form a polymer melt comprising water and methylene chloride;

Step (C) removing a portion of the water and methylene chloride from the polymer melt through said first vacuum vent to form a partially devolatilized polymer melt;

Step (D) subjecting the partially devolatilized polymer melt to additional melt kneading in a secondary melt kneading section; and Step (E) removing an additional amount of water and methylene chloride from the partially devolatilized polymer melt at said second vacuum vent.

51. A method according to claim 50 wherein said bisphenol A polycarbonate comprises between about 0.1 and about 20 percent by weight water, and between 0.1 and about 5 percent by weight methylene chloride.

52. A method according to claim 50 wherein said extruder is a twin screw co-rotating extruder.

53. A method according to claim 50 wherein the extruder further comprises between about 5 and about 10 barrels.

54. A method according to claim 50 wherein the extruder is operated in a temperature range between about ambient temperature and about 400° C.

55. A method according to claim 50 wherein Step (B) comprises heating and shearing the polymer melt at a temperature in a range between about 200° C. and about 350° C.

56. A method according to claim 50 wherein said first and second vacuum vents are operated in a range between about ambient pressure and about 1 torr said second vacuum vent being operated at a pressure lower than that at which said first vacuum vent is operated.

57. A method according to claim 50 wherein the extruder further comprises at least one additional vacuum vent.

58. A method according to claim 50 wherein said primary kneading section comprises two or more forward flighted kneading blocks.

59. A method according to claim 50 wherein said secondary kneading section comprises both forward and rearward flighted screw elements.

60. A method according to claim 50 wherein said secondary kneading section comprises at least one distributive mixing element.

61. A method according to claim 50 further comprising recovering a bisphenol A polycarbonate composition which contains less than about 5 percent by weight water and less than about 1 part per million methylene chloride.

62. A method according to claim 61 further comprising operating the extruder at between about 50 and about 100 percent of its maximum power utilization.

63. A method according to claim 50 wherein said extruder has a length to diameter ratio between about 20 and about 60.

* * * * *